PACKAGING OF ELECTRONIC COMPONENTS

Filed July 24, 1961 2 Sheets-Sheet 1

INVENTORS
G. HARRY ASHBRIDGE, JAMES P. CASEY, ALEX C. FRANÇOIS,
FRANK J. LOHAN, DARRELL L. MITCHELL & JOSEPH E. SMITH JR.
BY Bower & Patalidis
ATTORNEYS

PACKAGING OF ELECTRONIC COMPONENTS

Filed July 24, 1961 2 Sheets-Sheet 2

INVENTORS

G. HARRY ASHBRIDGE, JAMES P. CASEY, ALEX C. FRANÇOIS, FRANK J. LOHAN, DARRELL L. MITCHELL & JOSEPH E. SMITH JR.

BY Bower & Patalidis

ATTORNEYS

United States Patent Office 3,218,518
Patented Nov. 16, 1965

3,218,518

PACKAGING OF ELECTRONIC COMPONENTS

G. Harry Ashbridge and James P. Casey, Northville, Alex C. Francois, Farmington, Frank J. Lohan, Detroit, and Joseph E. Smith, Jr., Birmingham, Mich., and Darrell L. Mitchell, Keene, N.H., assignors to Ex-Cell-O Corporation, Detroit, Mich.

Filed July 24, 1961, Ser. No. 126,217
3 Claims. (Cl. 317—101)

This invention relates generally to packaging or electronic components, and more particularly to means of uniting a plurality of electronic and electrical units in such a way as to greatly facilitate layout, assembly, checking and repair of a complete apparatus.

Modern electrical apparatus such as commonly found in digital computers, data processing equipment, radars, tape-controlled machine tools, and the like, require an enormous amount of interconnections of the basic individual elements making up the whole apparatus, with the attendant troublesome complexity in assembling, wiring, checking and trouble-shooting the apparatus.

The conventional method of assembly consists of permanently attaching to a chassis components which are then connected according to a predetermined wiring diagram. This method is extremely time consuming and fraught with inconveniences, as errors can easily be made. Also, the trouble-shooting and repair of such an appartus require the attention of a skilled technician, often for a considerable period of time, and the use of delicate and expensive test equipment.

Moreover, the present trend towards miniaturization of elements and compactness of assemblies further complicates the already existing problems by augmenting the chances of error, and by increasing the stray inductance and capacitance between the components and the connections between components.

Electrical apparatus of the computer and the like category employ many components which are substantially similar and which are interconnected in order to work together as a unit. A certain degree of standardization already exists in the field, and it is advantageous to design and manufacture elementary components in the form of plug-in modules. Flip-flop units, gating circuits, logical OR and AND circuits, amplifiers, counters, etc., can thus be plugged in sockets in a chassis that requires only connections to be established between the different sockets. This method greatly facilitates the assembly of the apparatus and enables a person of ordinary skill to check and repair the equipment by simply locating and replacing the faulty elementary circuit components. To a certain degree, even locating of the defective elements may be dispensed with because the plug-in modules may be exchanged on a trial and error basis as simply as is ordinarily done with electronic tubes.

The present invention contemplates a system for intercoupling a plurality of electrical and electronic units contained in a plurality of envelopes, using a building block principle which is believed to be much superior to what can be found in the prior art. The present invention contemplates to unite and interconnect a plurality of elementary modules into a functional unit assembly, with, in turn, a plurality of such functional unit assemblies being plugged into an electrical bay assembly. Several such electrical bay assemblies are placed together and interconnected into a housing in an electrical cabinet that makes up the complete apparatus.

It is, therefore, an object of the invention to provide an electrical apparatus which is made of a plurality of electrical bay assemblies contained in identical substantially parallelepipedonal envelopes.

It is a further object of the invention to provide electrical bay assemblies which are made of a plurality of plug-in functional unit assemblies contained in identical substantially parallelepipedonal envelopes.

It is another object of the invention to provide electronic functional unit assemblies which are made of a plurality of plug-in modular elements.

It is still an object of the invention to provide an electronic apparatus which is easy to assemble and which can be quickly checked and repaired by persons of ordinary skill.

It is another object of the invention to provide an electrical apparatus that greatly facilitates the wiring of the components, that uses simple, commercially available, inexpensive connectors for securing modular elements to a functional unit, and for, in turn, securing the functional units to an electrical bay assembly.

It is an object of the invention to provide a method of packaging electrical components that provides electrostatic and magnetic shielding that reduces to a minimum the interaction of stray interferences between the several components.

It is a further object of the invention to provide a method of packaging electrical equipment that keeps waste volume and weight to a minimum.

It is another object of the invention to provide an electrical apparatus that can be quickly repaired by merely replacing the defective component by an identical new component, be it a plug-in module, a plug-in functional unit, or an electrical bay assembly, according to the degree of the skill of the repairer, and of the refinement of the test equipment available to him.

It is yet another object of the invention to provide an electrical apparatus wherein the different components are securedly locked in position with no possibility of accidental severance.

Further objects, advantages and novel features which are believed to be characteristic of the invention, both as to its principle and as to its organization, will be better understood from the following description considered in connection with the accompanying drawings in which one embodiment of the invention is illustrated by way of example. It is to be understood, however, that the drawings are for the purpose of illustration and description only, and are not intended as a definition of the limits of the invention.

Figure 1:
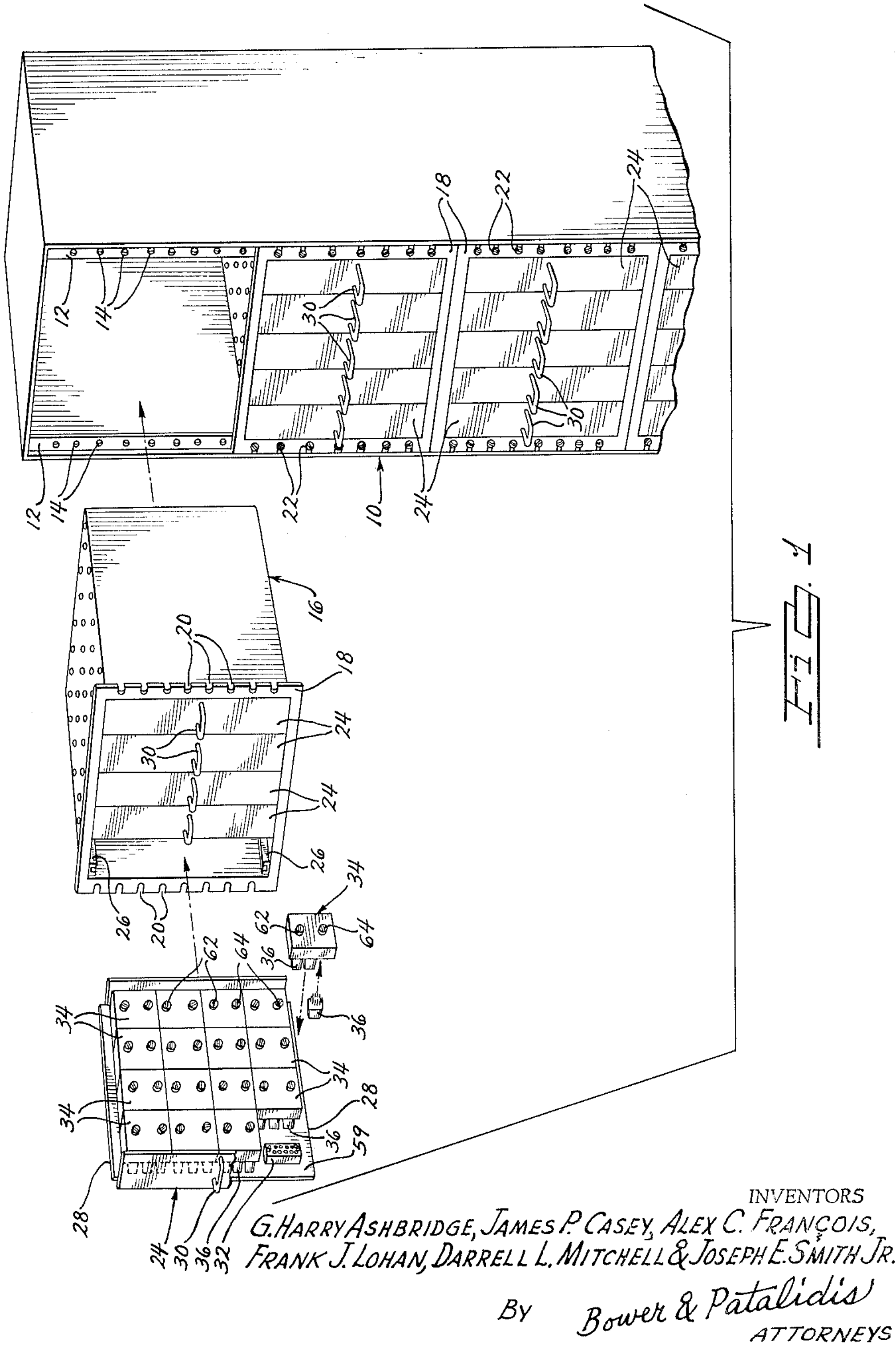
FIG. 1 is an isometric exploded view of the electrical apparatus of the invention, showing the components partly assembled and partly disassembled for the sake of clarity of description.

Referring now to the drawings, wherein like parts are designated by like reference characters throughout the several views, there is shown in FIG. 1 an electrical apparatus consisting of an enclosure or cabinet 10 provided with a pair of perforated mounting brackets 12—12 welded or otherwise fastened along the sides of the front of the cabinet. A bay housing 16 is fastened in position in the cabinet 10 by means of a mounting flange 18 having elongated perforations 20 adapted to correspond with the holes 14 of the cabinet mounting brackets. Screws, such as 22, are used to hold the bay housing in position in the cabinet.

Within each bay housing 16, a plurality of electrical bay assemblies 24 are slidably mounted, by means of symetrically disposed U-channels 26—26, disposed on two opposite sides of the bay housing and adapted to receive the rail elements 28—28 fastened to two opposite sides of each electrical bay assembly; each bay assembly has a handle 30 to facilitate pulling of the electrical bay assembly out of the bay housing.

Each electrical bay assembly is provided with a panel 59, hereinafter referred to as the top panel, upon which are regularly arrayed a plurality of multipin connectors 32. A plurality of separable electrical functional units 34 are plugged into the connectors 32, each one of the electrical functional units supporting in turn a plurality of separable modulator electrical units 36 plugged thereonto it will be hereinafter explained in detail.

Figure 2:
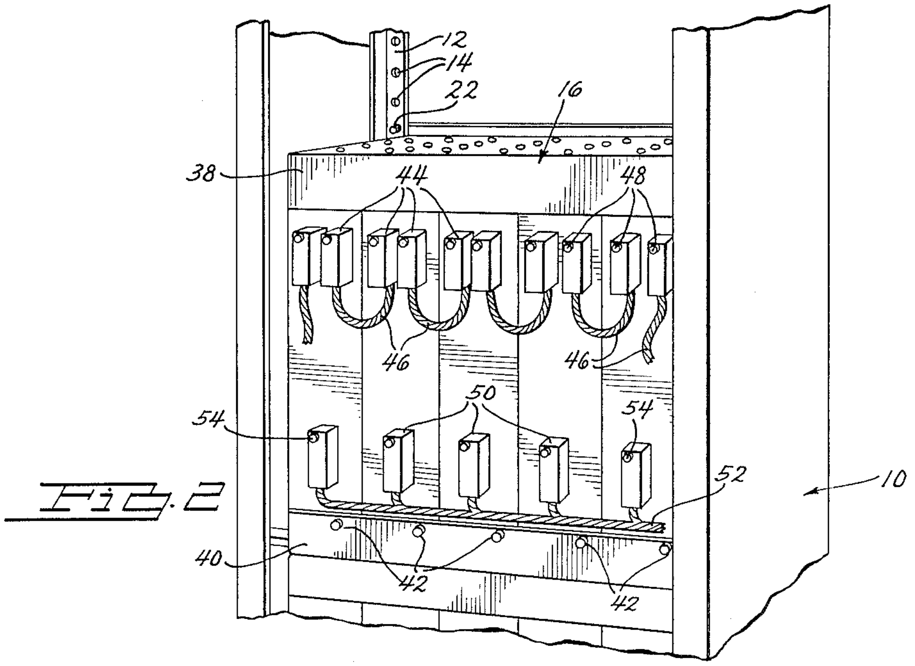
FIG. 2 is an isometric rear view of a portion of the electrical apparatus of FIG. 1, showing how some of the components are interconnected.

As shown in FIG. 2, each bay housing 16 is provided with two rear brackets 38 and 40, maintaining in alignment the row of electrical bay assemblies mounted therein. Screws, such as 42, are provided for holding the electrical bay assemblies securedly in place within the bay housing.

The electrical connection between the several electrical bay assemblies is effected by means of the plug-in connectors 44 and the electric wire harnesses 46. The electrical connection between the electrical bay assemblies and other electrical apparatus is effected by means of the plug-in connectors 50 and associated electric wire harnesses 52. Screw locking means 48 and 54 are provided for holding securedly in place the connectors 44 and 50 respectively.

Figure 3:
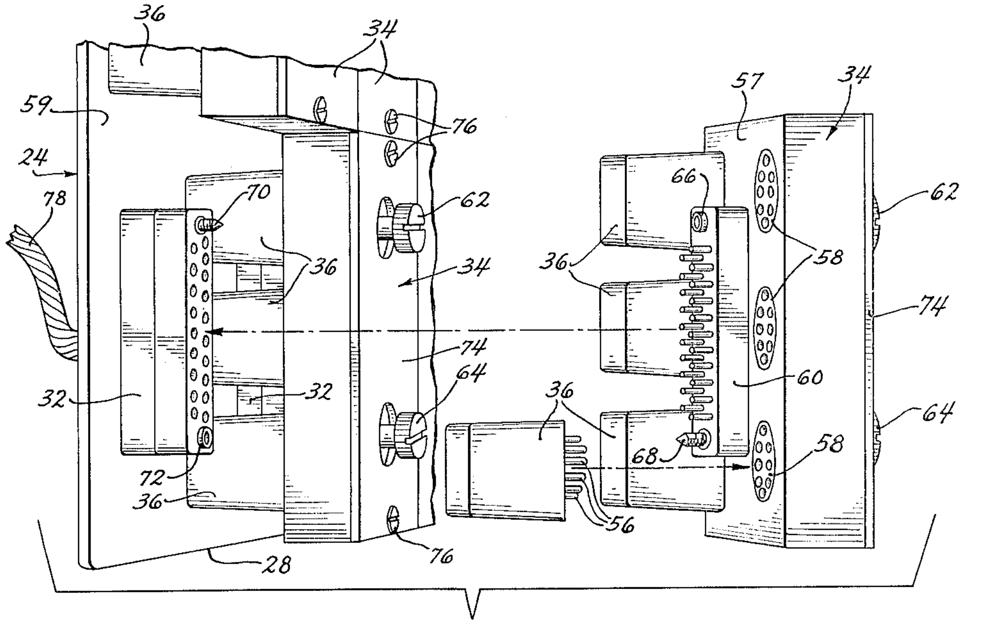
FIG. 3 is an isometric exploded view of some of the components of the electrical apparatus of the invention, showing the organization and interrelation of the elements.

FIG. 3 shows in detail the interrelationship between the modular electrical units 36, the electrical functional units 34 and the electrical bay assemblies 24. As mentioned above, the electrical bay assemblies 24 have a top panel 59, upon which are mounted a plurality of multipin connectors 32. Each electrical functional unit 34 is provided with a top panel 57 upon which is fastened a connector 60, complementary of the electrical bay assembly connector 32. On the top panel 57 of each electrical functional unit are arrayed a plurality of sockets 58. Each modular electrical unit 36 has pins 56 adapted to be plugged into each one of the sockets 58. The intermodular electrical connection (not shown) is effected by connecting the several sockets together, and other wire connections are brought to the complementary connector for junction with the electrical bay assembly wiring. A removable panel 74, held by screws 76, allows layout and soldering of the wiring and permits inspection and checking of the assembly. The electrical functional unit wiring is thus entirely enclosed in a shield which prevents stray interferences between the several electrical functional units. The wiring between the connectors 32 is effected by the wire harnesses 78 laid under the top panel 59 of the electrical bay assemblies.

The electrical functional units are securedly mounted in position by means of the screw-nut assemblies 70–66 and 72–68, which are tightened and loosened by means of the heads 62 and 64, thus maintaining the modular electrical units 36 locked between the top panels 59 and 57 of the electrical bay assemblies and electrical functional units respectively.

The invention contemplates that a resilient pad or the like, can be interposed between the two complementary halves of the connector means 32–60, for the purpose of cushioning shock and vibration, where so required in specific applications.

The envelopes of the components are parallelepipedonal in order to allow efficient stacking with a minimum of wasted space. By the term envelope is meant the geometrical envelope, rather than the actual physical envelope of the respective components, whether it be defined by panels or other physical enclosure, or not. Also the terms "top," "bottom" and "side" panels as applied to the chassis of the components are used for the sake of explanation, as it is evident that the components have no actual top, bottom, or sides, as they may be mounted in any position whatsoever, without detracting from the principle and scope of the invention.

In the preferred embodiment of the invention it is contemplated that six modular electrical units are plugged in each electrical functional unit, and that sixteen electrical functional units are plugged into each electrical bay assembly.

It is obvious that numerous other modifications and alterations may be made in the organization of the electrical apparatus of the invention. It is contemplated that the bay assemblies 24 may be mounted horizontally rather than vertically as herein illustrated, and that the number of modular electrical units 36 plugged in each electrical functional unit 34 and the number of electrical functional units plugged in each electrical bay assembly be different from what has been herein indicated in the illustration and description of the invention.

The modular electrical units need not be all of the same size as long as the height of their envelopes is substantially identical in order to fit properly and be maintained in position as explained hereinbefore. The invention contemplates that the modular electrical units be preferably of substantially identical sizes or of sizes that are a multiple of a certain given basic standard size, except that their height must remain substantially constant. Similarly the electrical functional units may be of a size which is the equivalent of either twice, three times or any multiple of a standard basic size as long as their height or thickness is substantially identical. Similarly the electrical bay assemblies must be of a given size as to their length and width, but their height may be such as can be accommodated in the bay housing, one such non-standard bay assembly replacing one, two, three or more standard-sized bay assemblies, as may be required.

Having thus described the invention, what is being claimed as new is:

1. An electrical apparatus comprising: a housing in the shape of a parallelepipedonal enclosure with at least one open end; a series of symetrically disposed parallel U-channels substantially perpendicular to the plane of the open end of said housing; a plurality of electrical bay assemblies having rails on two opposite sides corresponding to an opposite pair of said channels for slidable engagement therewith for mounting of said bay assemblies within said housing; mechanical means locking said bay assemblies securedly in position in said housing; electrical wire connections between the several such bay assemblies by means of multipin plug-in connectors; a plurality of electrical functional units contained in substantially identical parallelepipedonal envelopes plugged in regularly disposed connectors in each one of said electrical bay assemblies; mechanical means for locking said electrical functional units securedly in place; electrical wire connections between said connectors; a plurality of modular electrical units contained in substantially identical envelopes plugged in regularly disposed sockets in each one of said electrical functional units; and electrical wire conncetions between said sockets, and between said sockets and said connectors within each one of said electrical functional units.

2. An electrical apparatus as claimed in claim 1, wherein the mechanical means for locking said electrical bay assemblies in said housing and said electrical functional units in said electrical bay assemblies comprise a thumb screw-nut arrangement.

3. An electrical apparatus comprising: a housing; a plurality of removable electrical bay assemblies stacked in said housing; electrical wire connections between the several electrical bay assemblies; a plurality of removable electrical functional units plugged in each one of said electrical bay assemblies; electrical wire connections between the several electrical functional units; a plurality of removable modular electrical units plugged in each one of said electrical functional units, said modular electrical units being disposed between said bay assemblies and said functional units; electrical wire connections between the several modular electrical units; and mechanical locking means for securely fastening said electrical bay assemblies in said housing and said electrical functional units onto said electrical bay assemblies, wherein said modular electrical units are securely maintained in position by being wedged between the top panel of the electrical functional unit and the top panel of the electrical bay assembly upon which said electrical functional unit is fastened.

References Cited by the Examiner

UNITED STATES PATENTS

| | | | |
|---|---|---|---|
| 2,495,339 | 1/1950 | Markowitz | 317—99 |
| 2,885,600 | 5/1959 | Wiseman | 317—99 |
| 2,966,618 | 12/1960 | Lehner | 174—68 |
| 3,014,160 | 12/1961 | Brogden | 317—101 |
| 3,129,991 | 4/1964 | Schmitz | 317—101 X |

KATHLEEN H. CLAFFY, *Primary Examiner.*

JOHN F. BURNS, *Examiner.*